Figure 4:
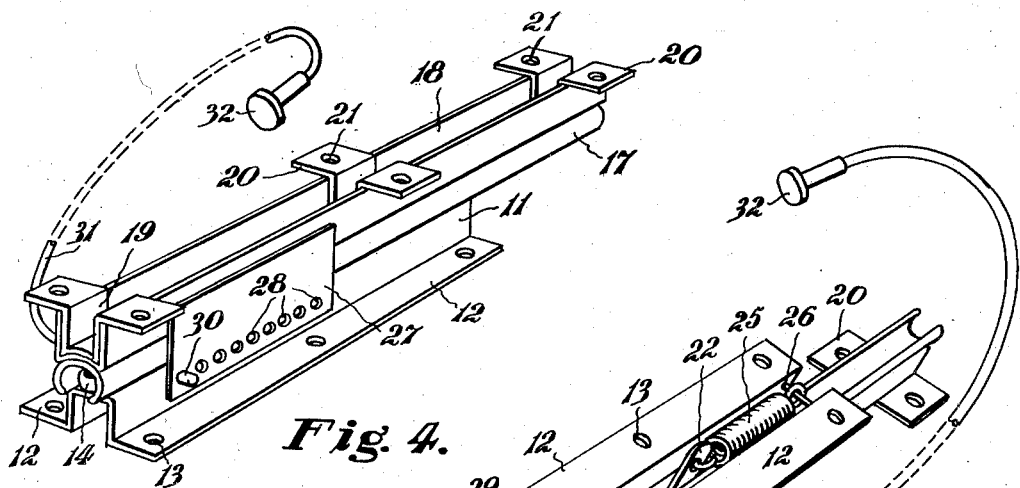

Dec. 25, 1951      L. F. MORONEY      2,579,599
SLIDABLE AND ADJUSTABLE SEAT
Filed July 19, 1946      3 Sheets-Sheet 1
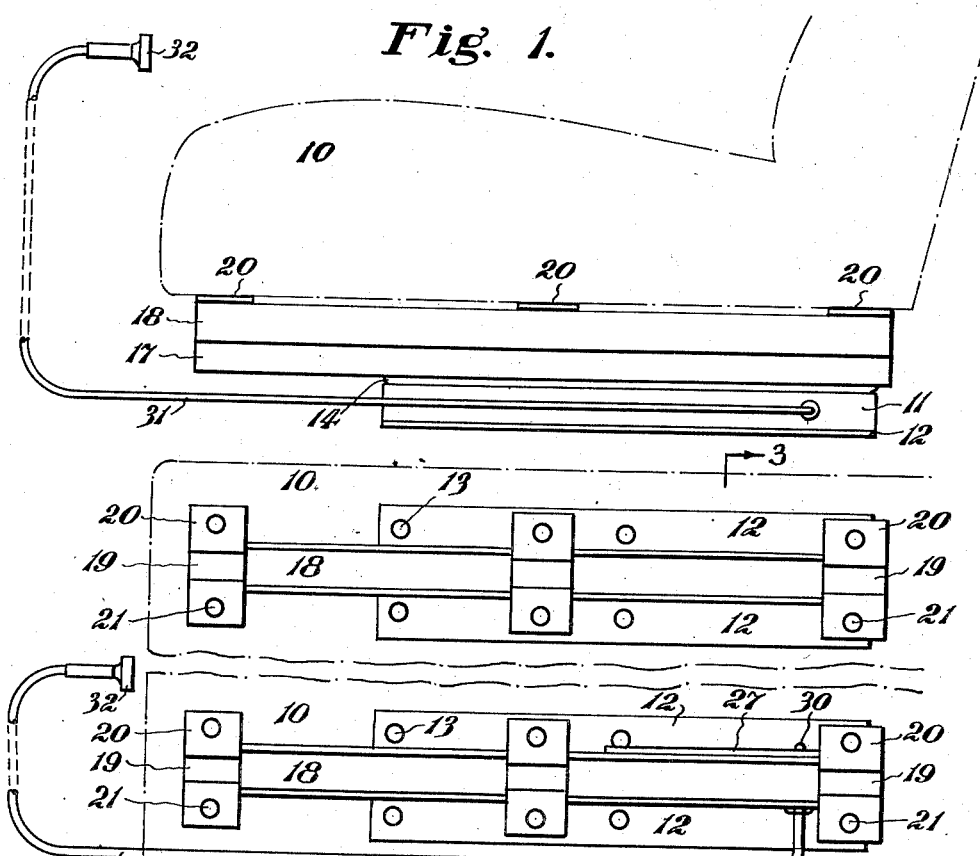
Fig. 1.
Fig. 2.
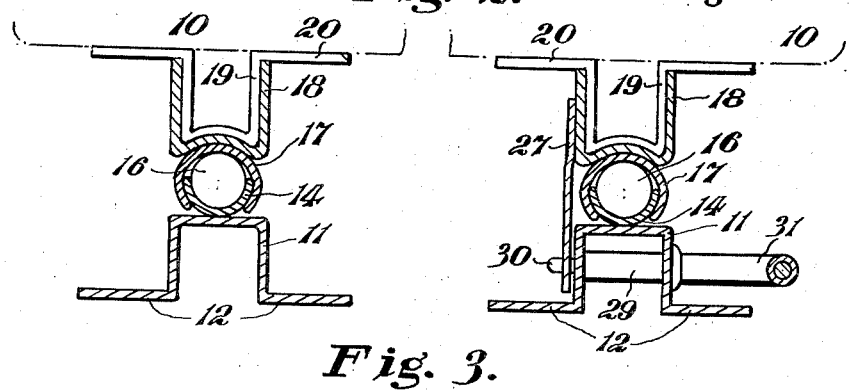
Fig. 3.
INVENTOR
LAURENCE FRANCIS MORONEY
BY Oberlin & Limbach
ATTORNEYS INVENTOR
LAURENCE FRANCIS MORONEY
BY Oberlin & Limbach
ATTORNEYS Dec. 25, 1951   L. F. MORONEY   2,579,599
SLIDABLE AND ADJUSTABLE SEAT
Filed July 19, 1946   3 Sheets-Sheet 3
Fig. 8.
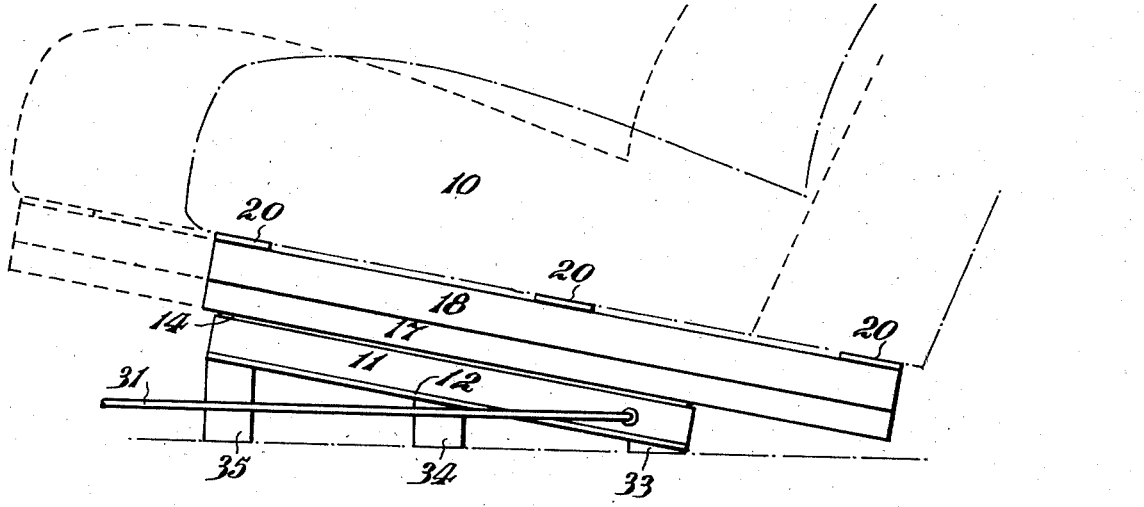
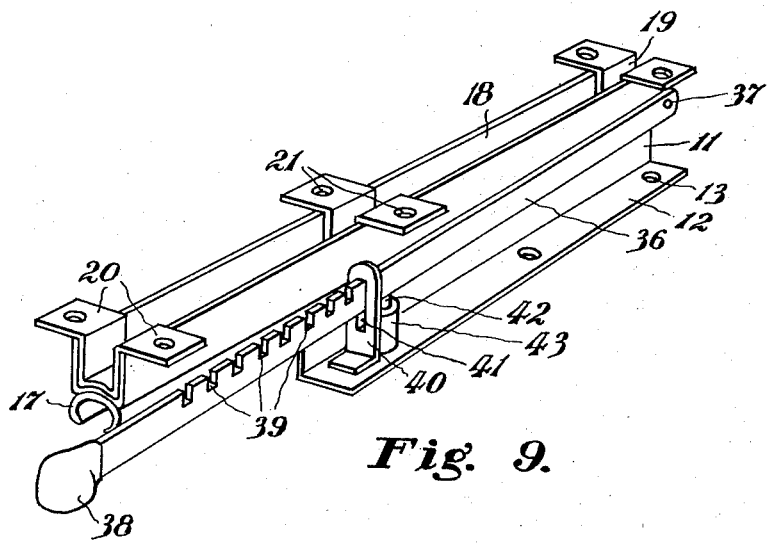
Fig. 9.
INVENTOR
LAURENCE FRANCIS MORONEY
BY Oberlin & Limbach
ATTORNEYS Patented Dec. 25, 1951

2,579,599

UNITED STATES PATENT OFFICE 2,579,599

SLIDABLE AND ADJUSTABLE SEAT

Laurence Francis Moroney, Moonee Ponds, near Melbourne, Victoria, Australia

Application July 19, 1946, Serial No. 684,646
In Australia August 10, 1945

7 Claims. (Cl. 155—14)

1

This invention relates to improvements in or connected with slidable and adjustable seats, and it has more particularly reference to an improved mechanism whereby a seat may be readily moved back and forth or, if desired, moved simultaneously forwards and upwards, or rearwards and downwards.

My invention is particularly applicable to the seats of automobiles, but it may with equal advantage be applied to seats of aircraft, railway coaches and other vehicles, and, in general, to any seats which are of such nature that it is deemed to be advantageous to provide means whereby the said seats may be adjusted to suit people of varying heights and builds.

The principal object of my invention is to provide an improved mounting for a seat whereby the said seat may be moved forwards and backwards with a minimum of effort.

A further object of my invention is to provide an improved seat mounting whereby the seat may be moved simultaneously forwards and upwards, or rearwards and downwards with little effort.

Yet another object of my invention is to provide an adjustable seat mounting which includes means whereby the said seat may be conveniently and releasably locked in desired position.

Still another object of my invention is to provide an adjustable seat mounting for the purposes set forth which will be durable in use, inexpensive to construct, and provided with means whereby friction of the moving parts is greatly reduced so that the said mounting will have a long and trouble-free life, and the position of the seat may be adjusted with a minimum of effort.

In order to achieve these and other objects, my invention resides broadly in the provision of a slidably adjustable mounting for a seat comprising a lower channel of arcuate cross-section adapted to be secured to a fixed support; bearing balls closely fitting in the said lower channel and longitudinally movable therein; an upper inverted channel adapted to be secured to a movable seat, the upper portion of the inverted channel being adapted to bear on the said ball bearings, its lower portions being of arcuate cross-section and closely and slidably fitting about and under the arcuate lower channel on both sides. A spring is connected between the inverted channel and the channelled runway to cause said inverted channel to move forwardly, and a releasable catch is provided, being adapted to hold the seat in any desired adjusted position. Two mountings may be provided, one at each side of

2 the seat to ensure smoothness of operation, or there may be a greater number of slidable fittings arranged beneath the seat, depending on the width thereof.

In order that my invention may be more readily understood, reference is now made to the accompanying drawings, wherein:

Fig. 1 shows in side elevation a slidably adjustable seat mounting according to one form of my invention, Fig. 2 is a plan view of the mechanism shown in Fig. 1, Fig. 3 is a sectional view, to enlarged scale, along line 3—3 in Fig. 2.

Figure 5:
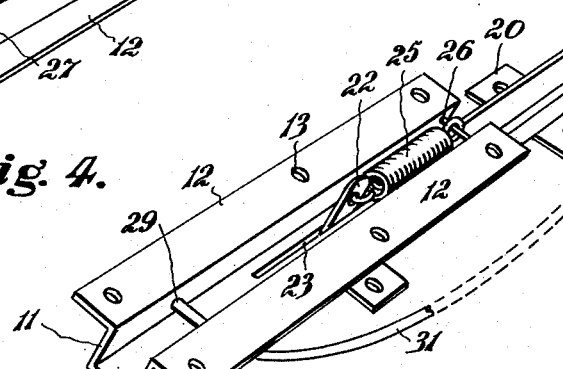
Figure 6:
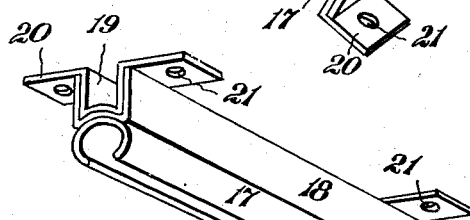
Figure 7:
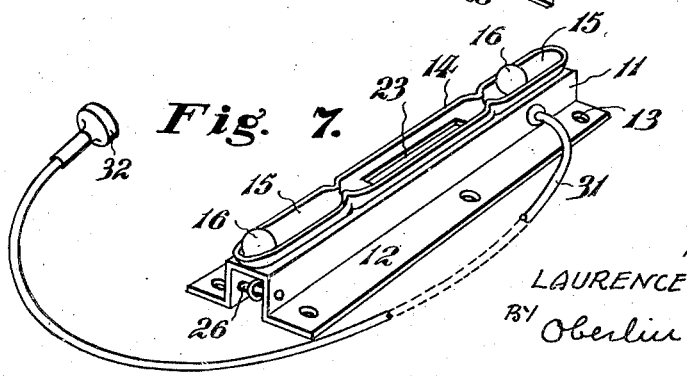

Fig. 4 illustrates in perspective, from a rear quarter, one of the slidably adjustable seat mounting shown in Figs. 1, 2 and 3, Fig. 5 is a perspective view showing the underside of the seat mounting shown in Fig. 4, Fig. 6 is a perspective drawing, from a front quarter, of the upper portion of the seat mounting shown in Figs. 4 and 5, Fig. 7 is a perspective view, from a front quarter, of the lower portion of the seat mounting illustrated in Figs. 4 and 5, Fig. 8 is a side elevational view of a modified arrangement of slidable seat mounting according to my invention, and Fig. 9 is a perspective view of a slidable and adjustable seat mounting according to a further modification of my invention.

For clarity of description, reference will first be made to Figs. 1 to 7 of the accompanying drawings. In these views, a vehicle seat is indicated, for convenience, in phantom or broken outline, and is designated 10. The said seat may be of any desired type, and it is illustrated as being mounted on two slidably adjustable mechanisms. Each of the said slidably adjustable mechanisms includes a lower assembly (see particularly Fig. 7) and an upper assembly (see particularly Fig. 6). Each of the lower assemblies includes a length of "top-hat section" metal which forms a housing 11 and two integral base flanges 12. Apertures 13 are formed in the base flanges 12 so that the lower assembly may be secured by screws, rivets or the like to a floor or other support. Welded or otherwise secured to the upper surface of the housing 11 is a channel-piece 14 which is arcuate or substantially semi-circular in cross-section. At predetermined intervals, the sides of the channel-piece 14 are pinched inwardly to define and limit runways 15 for steel ball-bearings 16 which fit easily in the said runways (see Figs. 3 and 7).

The upper assembly includes a channel-piece 17 which is so shaped that it fits over the side portions of the lower channel 14 and bears upon the ball bearings 16 in the runways 15. The lower edges of the upper channel 17 are arcuately shaped in cross-section and inturned so that they pass closely but slidably part way around and under the sides of the lower channel 14. That is, the channels 14 and 17 as shown at Fig. 3 are telescoping tubes longitudinally slotted, the slotted or cut-away sides being oriented away from each other. The ball bearings 16 enable the said upper channel 17 to move slidably and with little friction over the lower channel 14, and the snug interfitment of the two channels acts to restrain the entry into the runways 15 of dust, dirt and other foreign matter. Welded or otherwise secured above the said upper channel is a seat bearer 18 which is substantially U-shape in cross-section. Where the seat construction requires it, brackets 19 are secured, as by welding, to the seat bearer 18 in desired spaced relationship, and these brackets are provided with outturned lugs 20 having apertures 21 formed therein. Screws may be fitted through the said apertures 21 to engage in the seat 10 and thereby secure the upper mounting assembly to the underside of the said seat.

A metal tongue 22 is welded or otherwise secured to the underside of the upper channel at or about its mid-point. Extending downwardly the said tongue passes through a slot 23 formed through the lower channel-piece 14 and correspondingly through the upper surface of the housing 11 into the said housing. An aperture 24 is formed near to the lower end of the said tongue 22 to provide a convenient anchorage for one end of a helical tension spring 25 (see Fig. 5). The said spring lies within the housing 11, and it is anchored at its other end to a cross-bar 26, which is fitted across the front portion of the said housing.

The action of the said helical spring 25 is to carry the upper assembly and the seat 10 secured thereto forwardly in relation to the lower assembly, which is secured to a floor or the like. The seat may, however, be impelled rearwardly against the spring action of the two sliding seat mechanisms with relatively little effort.

On one of the slidable seat mountings means are provided whereby the seat may be releasably locked in desired adjustment, the said means consisting broadly of a member associated and movable with the upper assembly and having apertures adapted to be releasably engaged by a catch associated with the lower assembly; means for holding the catch normally in engagement with the said member; and means for disengaging the said catch. The preferred construction of releasable locking means illustrated comprises a plate or rack 27 welded to the bearer 18 and having a series of spaced holes 28 formed near the lower edge thereof. A plunger housing 29 is secured transversely in the bearer 18 and holes are formed in the opposite sides of the said bearer in alignment with the said plunger housing. A spring loaded plunger 30 is slidable within the said plunger housing 29 so that it may project through the said bearer, and it is thus adapted for selective engagement in any of the holes 28 in the rack 27. The plunger is connected to one end of a flexible cable 31, the opposite end of which is connected to a knob 32 adapted to be mounted in a convenient position such as the dashboard of an automobile. When the knob 32 is pulled, the plunger 30 is retracted into its housing 29 and so is disengaged from the holes 28 of the rack 27. The seat 10 is then free to ride forward under the action of the springs 25, or it may be pushed back against the action of the said springs. When the seat is in desired adjustment, the knob 32 is released, whereupon the plunger 30 returns to locking position, engaging in an appropriate aperture 28.

If it is desired that the seat 10 should move upwards as it moves forwards, and downwards as it moves backwards, the sliding seat mechanisms are mounted at a desired inclination to the horizontal plane, as is illustrated in Fig. 8. In this drawing, the slidable mechanisms are constructed and arranged as hereinbefore described, but the base flanges 12 are secured to suitable blocks or bridges designated 33, 34 and 35. The said bridges may be constructed of timber or of metal or of any other suitable material or combination of materials. The underside of the seat 10, in such case, is at a similar inclination to the horizontal plane.

Referring now to Fig. 9 of the accompanying drawings, there is illustrated a modified form of releasable locking means for a slidably adjustable seat mounting. The seat mechanism is constructed and arranged substantially as hereinbefore described except that the aperture rack 27 and the interacting spring-loaded plunger 30 with associated housing 29, cable 31 and knob 32 are omitted. In lieu thereof there is provided a locking lever 36 which is pivotally mounted, as by a bolt 37, near to the rear end of the seat bearer 18. The said lever extends forwardly beyond the front of the seat mechanism, and terminates in a handle 38. A multiplicity of notches 39, in suitably spaced relationship, are formed in the upper surface of the locking lever 36, and are adapted for selective engagement with a bracket 40. The said bracket may suitably consist of a sheet metal strip, of which the lower portion is bent over at a right angle and welded or otherwise secured to the base flange 12 of the lower assembly. The locking lever 36 passes through a slot 41 formed in the said bracket, and the said slot is of such depth that when the locking lever is lowered, it will pass easily through the said slot; but when it is raised, any of the notches 39 formed therein is adapted to engage with a portion of the bracket directly above the slot 41.

A spring loaded plunger 42, slidably mounted in a plunger housing 43 which is secured to the base flange 12 of the lower assembly is so positioned and arranged that it bears against the underside of the locking lever 36, urging the said lever upwardly into locking engagement with the slotted bracket 40. By means of the conveniently situated handle 38, however, the locking lever 36 may be depressed against the action of the plunger 42 to clear the notches 39 from the bracket 40 and so enable the upper assembly to move forwardly under the action of its helical tension spring, or to be forced rearwardly against the action of the said spring. When the seat is in desired adjustment, the handle 38 is released, whereupon the spring loaded plunger 42 operates to force the locking lever 36 upwardly so that an appropriate notch 39 engages with the bracket 40 to hold the upper assembly, and the seat attached thereto, in desired position.

In using a seat adjustably mounted in accordance with my invention, the person sitting in the seat 10 may readily adjust the said seat to suit his particular build and immediate requirements. For example, if he desires to set the seat back (or, if the seat is constructed and arranged as shown in Fig. 8, back and down) he simply operates the sliding seat mechanism release means by pulling forward the release knob 32, or by depressing the locking lever handle 38, as the case may be. Then, by pushing with his legs, the sitter may easily position the seat in desired adjustment. The locking means is then permitted to revert to engaged position by releasing the knob or handle.

If it is desired subsequently to bring the seat forward (or forwards and upwards, if the seat mounting is arranged as shown in Fig. 8), the sitter releases the locking means provided, and permits the action of the helical tension springs 25 to move the seat forward to correct adjustment. The locking means are again permitted to engage to hold the seat locked in required position.

If it is considered necessary or desirable, the ball bearings 16 in the runways 15 may be packed in lubricant of suitable nature. It will be found that the construction of the slidable elements is such that the upper channel piece 17 acts to exclude dust, dirt and other foreign matter from the runways 15 formed in the lower channel 14, the upper channel 17 being made of such length that the runways 15 are not uncovered at any time during the movements of the seat 10.

Although the use of ball bearings has been described and illustrated, it will be understood that any free rolling type of bearing element is applicable.

It will be found that seat adjustment means according to my invention are particularly economical in manufacture and effective in achieving the objects for which they have been devised.

What I do claim is:

1. An improved slidably adjustable mounting for a seat comprising a lower channel of arcuate cross-section adapted to be secured to a fixed support; an inverted channel adapted to be secured to a movable seat; the side edges of said arcuate lower channel being pressed inwardly at intervals to define and limit co-linear runways; a bearing ball in each of said runways and longitudinally movable therein, the upper portion of said inverted channel being adapted to bear on the said bearing balls, the lower portions of the inverted channel being of arcuate cross-section and fitting closely and slidably about and under the arcuate lower channel on both sides; and a lock adapted to hold the seat releasably in desired position in relation to the said fixed support.

2. An improved slidably adjustable mounting for a seat comprising a lower channel of arcuate cross-section with its lowermost central portion secured to a housing adapted to be secured to a fixed support such as the floor boards of a vehicle; bearing balls closely fitting in the said channel and longitudinally movable therein; an inverted channel adapted to be secured to a movable seat, the upper portion of the inverted channel being adapted to bear on the said bearing balls, the lower portions of the inverted channel being of arcuate cross-section and fitting closely and slidably about and under the arcuate lower channel on both sides; a tension spring located within the housing and connected at its front end to the front portion of the housing and at its rear end to said upper inverted channel; and a lock adapted to hold the seat releasably in desired position in relation to the said fixed support.

3. An improved slidably adjustable mounting for a seat comprising a lower channel of arcuate cross-section adapted to be secured to a fixed support; bearing balls closely fitting in the said channel and longitudinally movable therein; an inverted channel adapted to be secured to a movable seat; the upper portion of the inverted channel being adapted to bear on the said bearing balls, the lower portions of the inverted channel being of arcuate cross-section and fitting closely and slidably about and under the arcuate lower channel on both sides; and a lock to hold the seat releasably in desired position in relation to said fixed support, including a lever pivotally connected at its rear end externally to the upper inverted channel so as to be adapted to be raised or lowered; a plurality of spaced notches formed in an edge of said lever; a fixed member associated with the lower channel and having an upright slot through which said lever passes; and a spring adapted to bring a notch in said lever into engagement with one end of said upright slot, said lever being adapted to be disengaged from said fixed member in opposition to the spring and be then freely slidable through the said slot.

4. An improved slidably adjustable mounting for a seat comprising a base, a lower channel member, stops in said lower channel member forming substantially co-linear runways at the opposite ends thereof, a slot in said lower channel member between said runways, a free rolling bearing element longitudinally movable in each of said runways, a slidable plunger outside of said channel member and fitted transversely through said base, a spring fitted about said plunger and adapted to impel it outwardly, a flexible cable connected to the said plunger and adapted to draw said plunger inwardly against the pressure of the spring, an inverted channel member fitting over and partially enclosing said lower channel member, said inverted channel member bearing upon said free rolling bearings, a bearer secured to said inverted channel member, an arm secured to said inverted channel member and adapted to project downwardly through the slot in said lower channel member and to be longitudinally movable therein, a rack secured to said inverted channel member, spaced apertures in said rack adapted to be selectively and releasably engaged by said plunger and a helical tension spring enclosed in said base and connected at one end to said downwardly projecting arm and at its opposite end to said base, said base and said bearer being adapted to be secured to a fixed support and to a slidable seat, respectively.

5. A slidably adjustable mounting for a seat comprising telescoping tubular members with longitudinal openings facing each other, said members being adapted to be attached respectively to a seat and to the floor, a plurality of bearing balls in the runway between said tubular members, and one of said members having its edges pinched-in at spaced intervals.

6. A slidably adjustable mounting for a seat comprising telescoping tubes longitudinally open toward each other, bearing balls therebetween, a longitudinal housing supporting one said tube for a floor support and a longitudinal housing supporting the other tube and being attachable to the seat, a projection extending downwardly from the latter housing through its associated tube and through an elongated opening in the other tube, and enclosed means for urging the seat in one direction including a spring between said projection and a fixed point in the lower housing.

7. A slidably adjustable mounting for a seat comprising telescoping tubes longitudinally open toward each other, bearing balls therebetween, a longitudinal housing supporting each said tube, one housing for attachment to the seat and the other for attachment to the floor, and enclosed means for urging the seat in one direction including a spring within one housing and connecting between a point in it and a projection from the other housing.

LAURENCE FRANCIS MORONEY.

REFERENCES CITED

The following references are of record in the file of this patent:

UNITED STATES PATENTS

| Number | Name | Date |
| --- | --- | --- |
| 1,049,263 | Pigg | Dec. 31, 1912 |
| 1,987,431 | Browne | Jan. 8, 1935 |
| 2,014,553 | Browne | Sept. 17, 1935 |
| 2,261,728 | Lawler | Nov. 4, 1941 |
| 2,277,357 | Saunders | Mar. 24, 1942 |
| 2,278,101 | Browne | Mar. 31, 1942 |
| 2,286,946 | Ball | June 16, 1942 |

FOREIGN PATENTS

| Number | Country | Date |
| --- | --- | --- |
| 102,899 | Australia | Dec. 30, 1936 |
| 839,713 | France | Jan. 7, 1939 |
| 371,840 | Great Britain | Apr. 27, 1932 |